United States Patent
Rius Rossell et al.

(10) Patent No.: US 10,122,895 B2
(45) Date of Patent: Nov. 6, 2018

(54) PRINT CALIBRATION

(71) Applicant: HEWLETT-PACKARD DEVELOPMENT COMPANY, L.P., Houston, TX (US)

(72) Inventors: Marti Rius Rossell, Sant Cugat del Valles (ES); Peter Morovic, Sant Cugat del Valles (ES); Jan Morovic, Colchester (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/314,882

(22) PCT Filed: Jun. 2, 2014

(86) PCT No.: PCT/EP2014/061405
§ 371 (c)(1),
(2) Date: Nov. 29, 2016

(87) PCT Pub. No.: WO2015/185102
PCT Pub. Date: Dec. 10, 2015

(65) Prior Publication Data
US 2017/0201654 A1      Jul. 13, 2017

(51) Int. Cl.
*G06F 15/00* (2006.01)
*G06K 1/00* (2006.01)
*H04N 1/60* (2006.01)
*H04N 1/00* (2006.01)

(52) U.S. Cl.
CPC ....... *H04N 1/6041* (2013.01); *H04N 1/00023* (2013.01); *H04N 1/00031* (2013.01); *H04N 1/00045* (2013.01); *H04N 1/00087* (2013.01); *H04N 2201/0005* (2013.01); *H04N 2201/0082* (2013.01)

(58) Field of Classification Search
CPC ............ H04N 1/6041; H04N 1/00023; H04N 1/00031; H04N 1/00045; H04N 1/00087; H04N 2201/0005; H04N 2201/0082
See application file for complete search history.

(56) References Cited

U.S. PATENT DOCUMENTS

| | | | |
|---|---|---|---|
| 5,512,986 | A | 4/1996 | Toyomura et al. |
| 6,204,873 | B1 | 3/2001 | Shimazaki |
| 7,034,968 | B2 | 4/2006 | Bhaskar et al. |

(Continued)

FOREIGN PATENT DOCUMENTS

| | | |
|---|---|---|
| EP | 1364796 | 11/2003 |
| EP | 1398951 | 3/2004 |
| JP | 2009165056 | 7/2009 |

OTHER PUBLICATIONS

Soler, et al. Efficient color printer characterization based on extended Neugebauer spectral models. Jan. 28, 2007.

*Primary Examiner* — Quang N Vo
(74) *Attorney, Agent, or Firm* — HP Inc. Patent Department

(57) ABSTRACT

Methods for configuring and calibrating a printing system are described. Configuring a printing system involves obtaining data for determining a reference print element in the printing system. The reference print element is then used to determine calibration data for a given print element. The calibration data is applied for the given print element to generate a print output.

8 Claims, 8 Drawing Sheets

(56) References Cited

U.S. PATENT DOCUMENTS

| | | | |
|---|---|---|---|
| 7,158,267 B2 * | 1/2007 | Chiu | H04N 1/401 |
| | | | 250/208.1 |
| 8,414,102 B2 | 4/2013 | Viturro et al. | |
| 8,643,920 B2 | 2/2014 | Campbell et al. | |
| 2010/0149559 A1 * | 6/2010 | Morales | H04N 1/6033 |
| | | | 358/1.9 |
| 2012/0327476 A1 | 12/2012 | Campbell et al. | |

* cited by examiner

PRINT CALIBRATION

BACKGROUND

Printing systems are arranged to output a printed image. In certain cases, for example a print operation with a large number of copies, it may be helpful to distribute the print operation across a number of printing systems. In these cases, each printing system may produce a different output image based on a common input image. For example, variations in configurations and/or operating conditions may lead to color inconsistency. Also, a common image may have to, or have cause to, be reproduced across different media. For example, certain printing systems may be used with a variety of media types. In these cases, variations in configurations and/or operating conditions may also lead to color inconsistency.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

Figure 1:
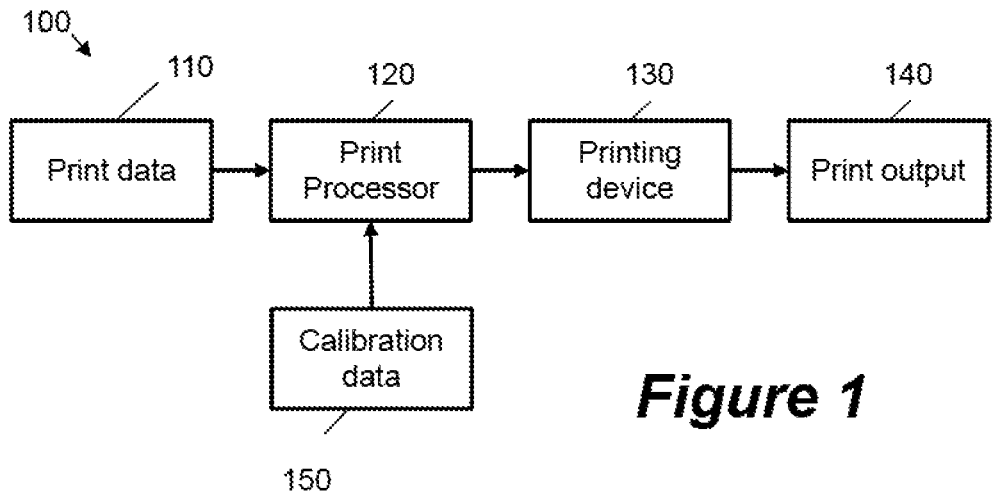
FIG. 1 is a schematic diagram of a printing system according to an example.

In the following description, for purposes of explanation, numerous specific details of certain examples are set forth. Reference in the specification to "an example" or similar language means that a particular feature, structure, or characteristic described in connection with the example is included in at least that example, but not necessarily in other examples.

Certain examples described herein relate to printing systems. A printing system may include a printer. In certain cases, the printer may be an inkjet printer, for example a scanning inkjet printer or a page wide array printer. Such a printing system may comprise a plurality of print elements. A print element may be a print head or die. The print head may consist of a plurality of nozzles, for example a print head may consist of one or more silicon pieces known as dies in which the printing nozzles are formed. Each nozzle may be arranged to deposit one or more drops of a printing fluid, such as an ink, a gloss and/or a varnish; although, in the following, we will refer to "ink" for convenience and ease of explanation. There will be a set amount of ink that is released in each drop, e.g. a large drop has a different volume of ink to a small drop. Certain printers may deposit a plurality of ink drops when an instruction is received to actuate the nozzles, e.g. the printer may receive a command based on image data to deposit d drops of ink for a given pixel. The volume of ink released by a nozzle in a single drop may be referred to as its ink drop density (IDD). It may be assumed that the IDD across a given die is constant, and also assumed that the IDD across many dies can be different. For example, some print heads may allow drops of different sizes to be ejected. Therefore the many dies (and therefore print heads) may need calibrating.

In certain other cases, the printer of the printing system may be a laser printer, or a photocopying machine, a print element may be an electrostatic drum and a toner material may be deposited onto the electrostatic drum and transferred to a medium to obtain a print output.

More generally, examples described herein apply to printing systems, for example, which are configured to generate a print output based on a deposition of material, such as an ink or a toner, or in any other kind of printing system that deposits different materials or fluids to create a color.

For convenience herein, the term "colorant" will be used to encompass all kinds of printing material, for example toner and/or fluid. The colorant creates a color. The colorant may create a change in color. For the avoidance of doubt, colorant includes black, i.e. a deposition of material to create a black print output or to modify the shade of another color.

Certain examples described herein relate to color calibration for printing systems. In this context a "color" may be defined with reference to a particular representation or model. This definition of a color may be defined as "colorimetry". For example, in a Cyan, Magenta, Yellow and Black (CMYK) color model, four variables are used in a subtractive manner to represent different quantities of colorant. The CMYK model may be used, amongst other colorant color models, by a printing system to produce a printed output. Other color spaces include the International Commission on Illumination (CIE) 1931 XYZ color space, wherein three variables ('X', 'Y' and 'Z' or tristimulus values) are used to model a color, and the CIE 1976 (L*, a*, b*—CIELAB) color space, wherein three variables represent lightness ('L') and opposing color dimensions ('a' and 'b'). Certain color models, such as CMYK may be said to be device-dependent, e.g. an output color with a common CMYK value may have a different perceived color when using different printing systems. A calibration may be applied to achieve the same perceived color when output from different printing systems. The XYZ and L*a*b* color spaces may be said to be device-independent, e.g. colors are defined independent of their nature of creation or the device they are displayed on.

Many color values may be output by a printing system. Each print element in the printing system may have different performance characteristics for outputting a given color. For example, a new print element may have improved performance characteristics compared to an old print element. A print element may degrade over time or with use. The performance characteristics may have an effect on colorimetry or ink deposition metrics. A colorimetry or colorimetric value may relate to an observable or measurable quantity for a color output by the print element. For example, an old print element may produce a lighter perceived color than the color produced by a new print element, wherein the new print element may be perceived to output a darker color by comparison. As such a variation in a colorimetric value of an output may result from a degradation of a print element, e.g. a drop weight output by a set of nozzles may degradation by 10% over the lifetime of the print element.

Certain examples described herein relate to configuring and/or calibrating a printing system. Calibrating a printing system modifies its print output. Calibration may be performed according to calibration data for a print element. Calibrating a printing system may modify a deposition characteristic for a print element. For example, an applied calibration may modify the ink drop density outputted by a print element for a given colorimetric value. Applying a calibration to a printing system may modify a print element's colorimetric characteristics so as to shift those characteristics according to a reference.

Examples described herein relate to determining calibration data for a print element based on a reference print element. Certain examples are described where the reference print element relates to a "darkest" print element. In this way, a reference print element may be used as a reference for calibrating a printing system. It is to be understood that certain examples described herein may equally be applied to a calibration based instead on using a "lightest" print element. In certain cases where the calibration is based either on a darkest print element or a lightest print element, this may be seen as selecting a reference print element based on an extreme value of the deposition of printing fluid values available for any given printing system. In general, selection of a lightest or darkest print element may be seen to be a form of selecting a reference print element based on one or more reference criteria, these criteria being based on operating characteristics of print elements used in a printing system.

FIG. 1 shows a printing system 100 according to an example that may be used with the methods described herein. The printing system 100 may be used to produce a print output 140. The print output 140 comprises colored inks deposited on a print medium. In the example of FIG. 1, print data 110 is sent to a print processor 120. The print processor 120 processes the print data 110 and outputs control data that is communicated to a printing device 130. The printing device 130 generates a print output 140 as instructed by the print control data. Calibration data 150 is sent to the print processor where a calibration is to be applied to the printing system. The print processor 120 processes the calibration data 150 which modifies the outputted control data communicated to the printing device 130. In this way, the calibration data serves to modify the generated print output 140 from the printing device as instructed by the print control data.

Figure 2:
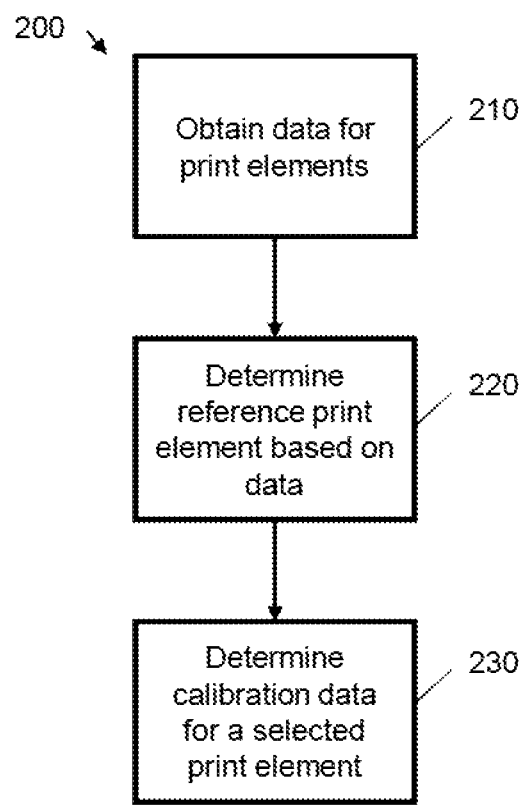
FIG. 2 is a flow chart showing a method for determining calibration data for a print element according to an example.

FIG. 2 shows a method for determining calibration data for a print element according to an example. At block 210 data is obtained for a plurality of print elements. In certain cases, these may comprise a set of print elements forming a print bar of a page-wide array printer. The data may relate to a set of characteristics of an output generated by a given print element. The characteristics may comprise a colorimetric-deposition relationship. For example, the data may relate to, for a given print element, a relationship between a colorimetric value and an ink drop density value for the print elements. In certain examples, the colorimetric value may comprise a lightness metric such as a measured lightness for an output printed using a given print element. Each print element may have a different relationship. The relationships may be defined as an array of colorimetric values and associated deposition values and/or by a given mathematical function that may be modelled from measured data. The relationships may be obtained experimentally as will later be described with reference to FIG. 7.

At block 220 a reference print element is determined based on the data obtained at block 210. The reference print element may be determined based on the respective plurality of relationships for the print elements. For example, for a given colorimetric value, the reference print element may be determined as the print element having the lowest ink drop density value, i.e. be a "darkest" print element for a given ink output or ink deposition value. The colorimetric value may be a lightness metric, such as an L* value in an L*a*b* color space. If a plurality of colorimetric-deposition data points define the relationship, a reference print element may be determined based on a statistical measure across the plurality of data points, e.g. may be selected as a print element with the average lowest deposition value. Similarly, if the data defines the relationship using a mathematical function, a statistical measure may be determined from the function. Conversely, if a calibration is chosen based on a "lightest" print element, the lightest print element may be selected as a print element with the average highest deposition value.

Once the reference print element is determined, at block 230 the calibration data for a selected print element is determined. The calibration data determines a deposition of printing fluid for the at least one selected print element with reference to the reference print element. For example, the calibration data may define a transformation of colorimetric-deposition data for a reference print element that enables the calibration of a print element that is not the reference print element. An example method to determine the calibration data is described later with reference to FIG. 5.

Figure 3:
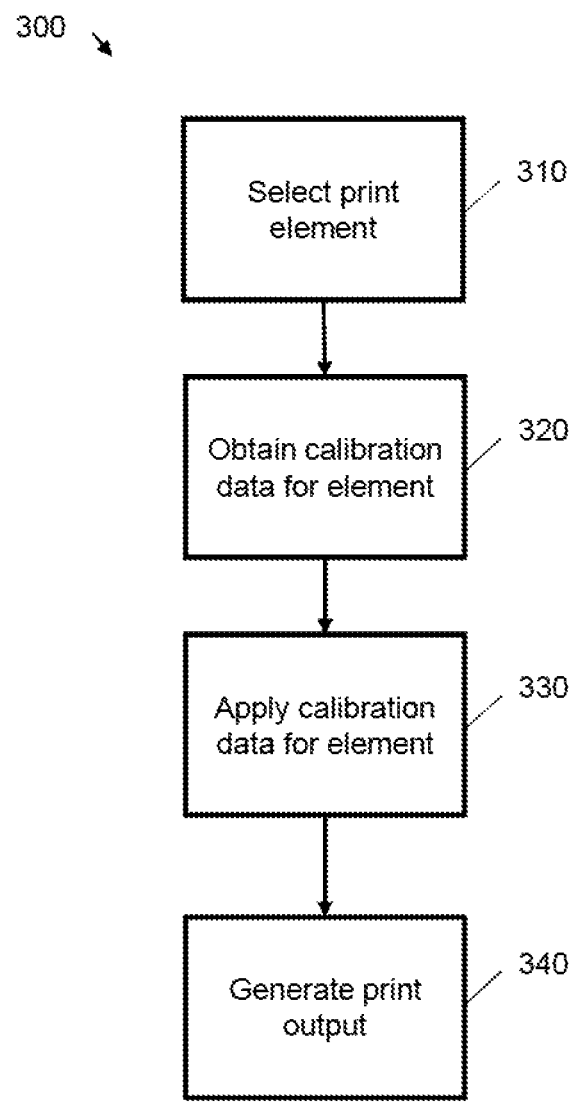
FIG. 3 is a flow chart showing a method for generating a calibrated print output according to an example.

FIG. 3 shows a method 300 for generating a calibrated print output according to an example. In certain cases this method 300 may be applied to use the calibration data generated by the method 200 of FIG. 2. At block 310 a print element is selected. For example, in a given printing system, this may comprise the selection of a given print element in the set of print elements for the system. In this manner, the method may be repeated for each print element in the set of print elements. At block 320 calibration data for the selected print element is obtained. This may comprise retrieving the calibration data generated at block 230 of FIG. 2. The calibration data may be retrieved from a memory or persistent storage device. At block 330 the calibration data for the print element is applied to the print element. This sets an output printing fluid deposition value for a given colorimetry as a function of the relationship between colorimetry and deposition of printing fluid for a reference print element, e.g. the reference print element determined at block 220 in FIG. 2. At block 340 a print output is generated. The calibration serves to modify the print output generated by the printing system, i.e. it dictates how the print output is to be generated.

Figure 4:
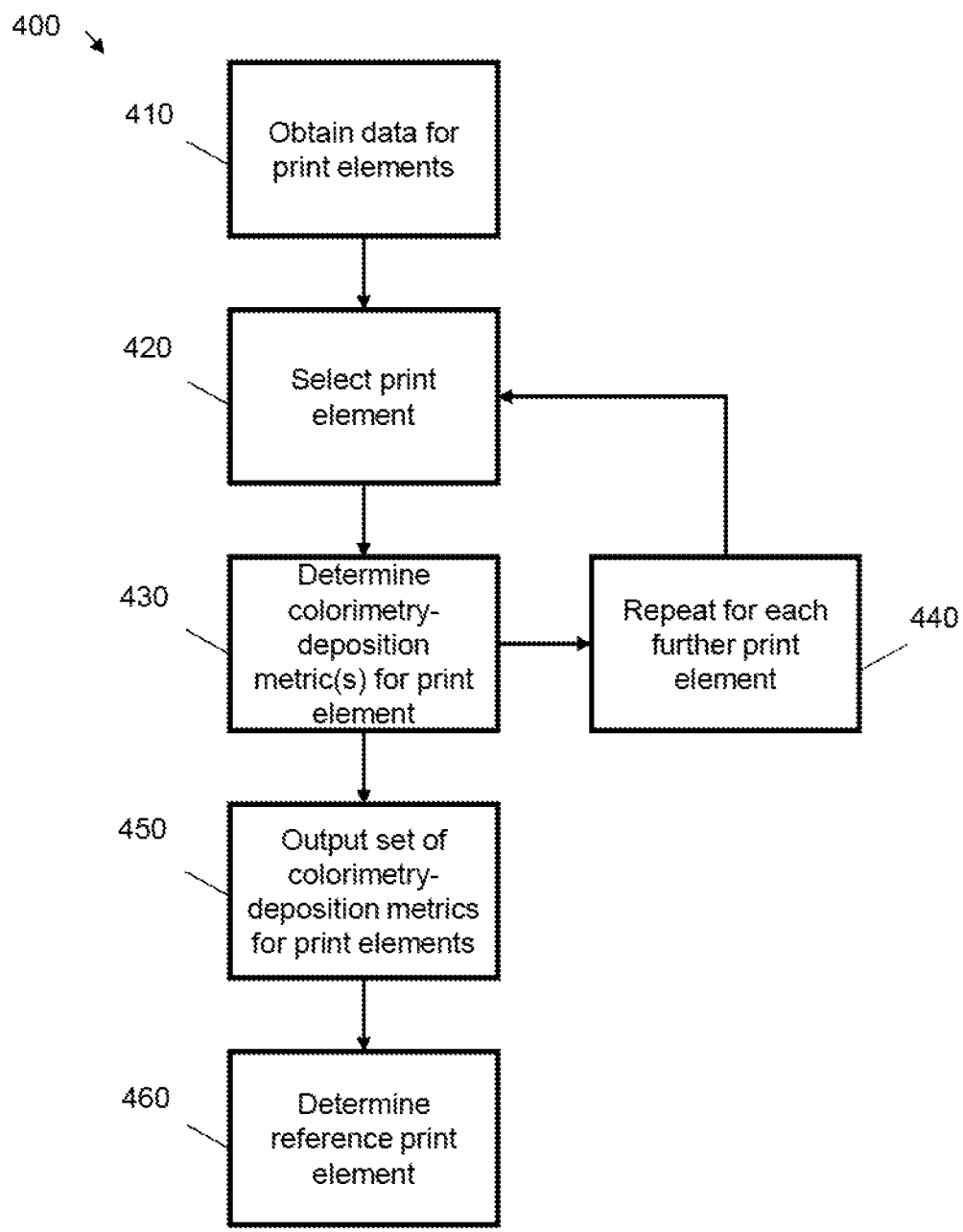
FIG. 4 is a flow chart showing a method for determining the reference print element according to an example.

FIG. 4 shows a method 400 for determining a reference print element according to an example. At block 410 data for a plurality of print elements is obtained. This may occur in a similar manner to block 210 of FIG. 2. At block 420 a print element is selected. At block 430 a colorimetry-deposition metric for the selected print element is determined. An example method of determining a colorimetry-deposition metric for a print element is described later with reference to FIG. 7. This may comprise, for example, determining a colorimetry-deposition metric that represents a reference print head. At block 440 this process is repeated for each further print element that is yet to be selected. For example, it may be repeated for all print elements in a printing system. Blocks 420, 430 and 440 may be repeated until all print elements in a printing system have been selected and a colorimetric-deposition metric determined for the plurality of print elements. At block 450 the set of colorimetry-deposition metrics for the plurality of print elements is output. This set of outputted colorimetry-deposition metrics is used to determine the reference print element at block 460. For example, the lowest metric in the set may be determined and the associated print element may be deemed the reference print element.

In certain cases, calibration data may be a calibration factor for a print element. As such, each print element may have a different calibration factor. The calibration factor may be determined in relation to a reference print element in the printing system, e.g. it may represent a ratio or other relative measure. The reference print element is then used as a reference for calibrating a selected print element, e.g. it may be used as a general basis for specific print element calibration. The selected print element may be selected from a plurality of print elements in a printing system. Alternatively, the selected print elements may be selected from a plurality of print elements in many printing systems. When the calibration is applied to the selected print element the ink drop density outputted by the nozzles of the print element is modified, e.g. the ratio or other relative measure may scale a defined ink drop density for the reference print element.

Figure 5:
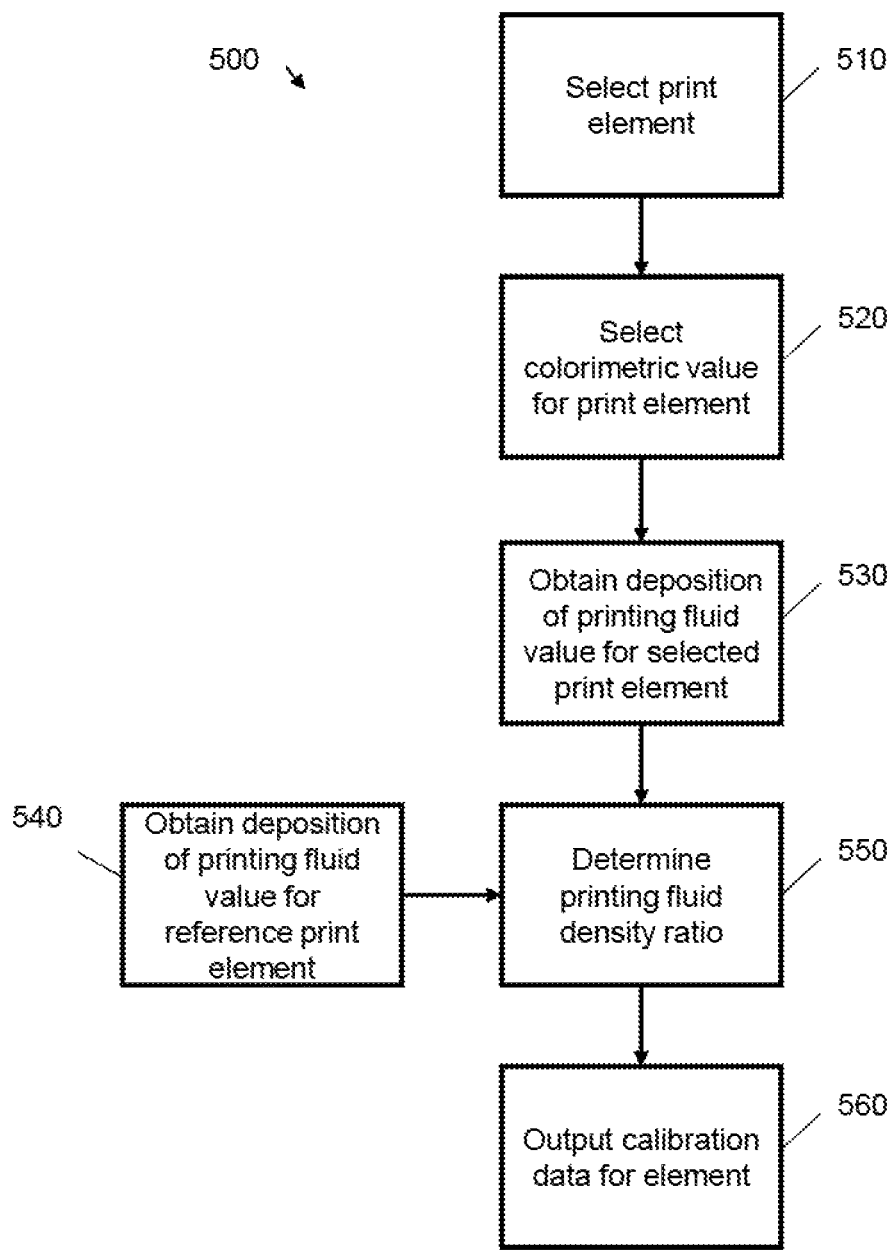
FIG. 5 is a flow chart showing a method for outputting calibration data for a print element according to an example.

FIG. 5 shows a method 500 for outputting at least a portion of calibration data for a print element according to an example. At block 510 a print element is selected. At block 520 a colorimetric value is selected for the print element. This colorimetric value may comprise one of a plurality of sample points or a single selected sample point. For example, if the colorimetric value comprises an L* value in a range of 0 to 100, the colorimetric value may comprise a single sample point, e.g. a value of 50, or one of a range of sample points, e.g. 12, 25 . . . 87, 100. At block 530, for the selected colorimetric value and the selected print element, a deposition of printing fluid value is obtained. This may be achieved experimentally, e.g. the nozzles in the selected print element can be actuated to cause ink drops to be ejected from the nozzles and the resultant ink drops that are deposited on a media, such as paper or acetate, may be measured to obtain a deposition of printing fluid value. Alternatively, if data representative of deposition characteristics of the print element is provided, this can be sampled at the selected colorimetric value, i.e. first obtain the L* values for the deposition of printing fluid values, then perform the procedure described above with reference to FIG. 5 analytically over the colorimetric-deposition relationships.

At block 550, the selected colorimetric value is used to obtain a deposition of printing fluid value for a reference print element. The reference print element may be determined as per block 220 of FIG. 2 or the method of FIG. 4. For example, a relationship between an L* value and an ink drop density value may be sampled at the selected colorimetric value, i.e. at a given L* value. At block 550 a ratio of printing fluid density is determined using the deposition of printing fluid values obtained from blocks 530 and 540. This ratio may form part of the calibration data for the selected print element. The ratio may be referred to as a calibration factor for the selected print element. The ratio is determined based on a deposition of printing fluid value for a reference print element. The ratio may be calculated by dividing the deposition of printing fluid value for the selected print element by the deposition of printing fluid value for the reference print element. In other words, the numerator of the ratio relates to the selected print element to be calibrated and the denominator of the ratio relates to the reference print element which is used as a reference. At block 560 calibration data for the selected print element is outputted. This may, for a given print element, take the form of a single ratio value or may be a statistical measure across a range of colorimetric values, e.g. may comprise an average and/or filtered deposition ratio value.

The method 500 of FIG. 5 may be applied to one or more print elements in order to calibrate the respective one or more print elements based on using a reference print element as a reference. The print elements selected may be in the same printing system as the determined reference print elements or the print element selected may be in a different printing system from the reference print element on which the calibration is based.

Figure 6:
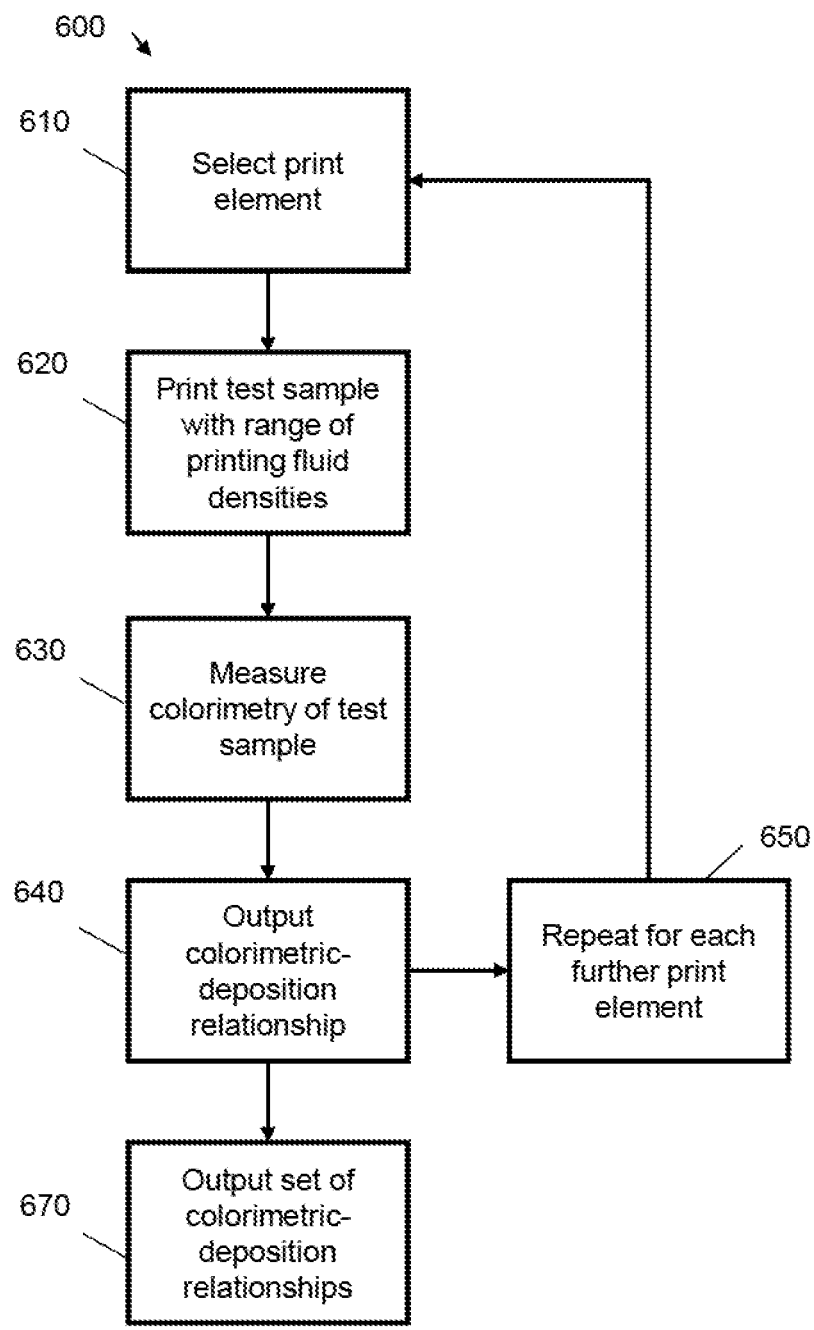
FIG. 6 is a flow chart showing a method for outputting a set of colorimetric-deposition relationships for print elements according to an example.

FIG. 6 shows a method 600 for outputting a set of colorimetric-deposition relationships for print elements. At block 610 a print element is selected from a plurality of print elements. At block 620 the selected print element is used to print a test sample with a range of printing fluid densities. For example, the density of printing fluid may be increase from a minimum density to a maximum density for the printing fluid of the print element. In a printing system with a range of ink drop values per pixel, e.g. 0 to d drops may be deposited per pixel, this range of ink drop values may be used to define the range of printing fluid densities.

At block 630 the colorimetry of the test sample for the print element is measured. The colorimetry values measured may relate to a lightness metric such as L*. Measurement may be achieved using a colorimeter. A colorimetry value may be obtained at each level of printing fluid density between the minimum and maximum printing fluid densities. This will provide a set of colorimetry values for a respective set of printing fluid density values. At block 640 the colorimetric-deposition relationship for the print element is output. At block 650 this process may be repeated to obtain a colorimetric-deposition relationship for further print elements to be selected. All print elements may be selected before the full set of colorimetric-deposition relationships are output for all print elements in the printing system at block 670. In one case, a mathematical function may be fitted to the measured colorimetric values for the defined range of printing fluid density values and the relationship may be defined by the function.

Figure 7:
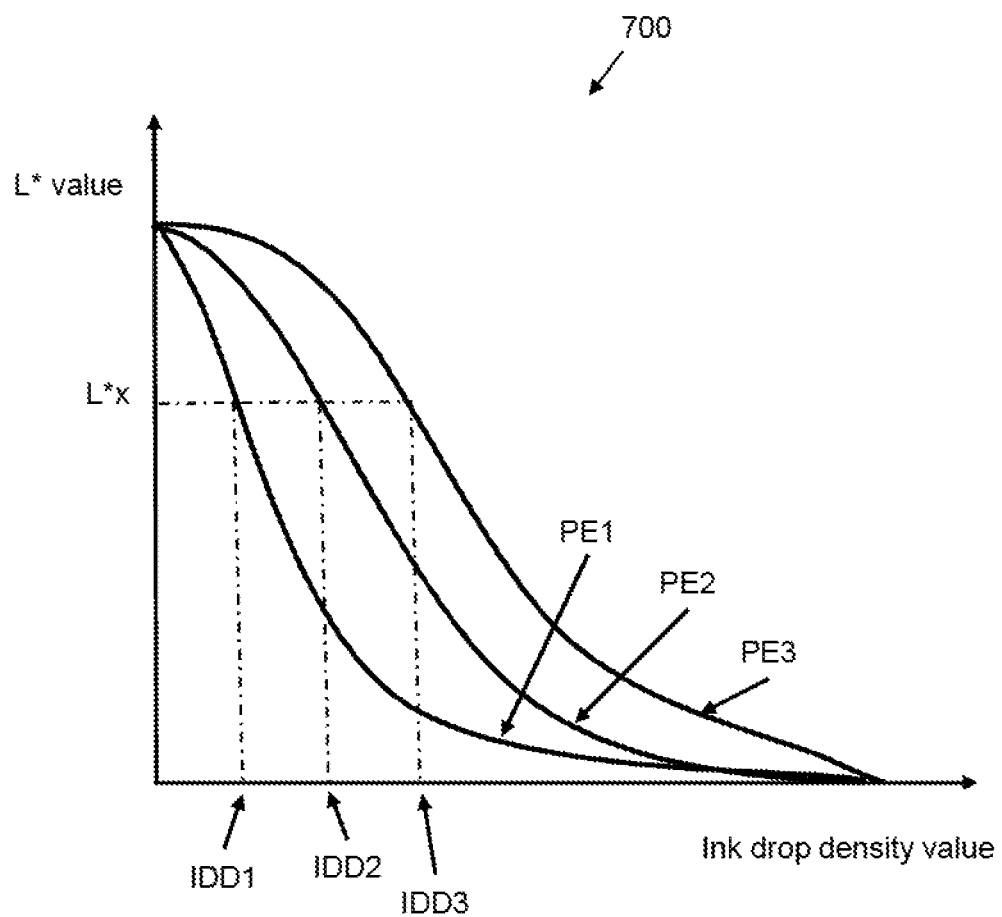
FIG. 7 is a schematic showing colorimetric-deposition relationships for print elements according to an example.

FIG. 7 shows colorimetric-deposition relationships 700 for three print elements. As described above with reference to FIG. 6, a print element may be selected, for example PE1 or PE2 or PE3. Assuming that PE1 is the first selected print element, PE1 is used to print a test sample wherein the density of printing fluid ejected from the nozzles of PE1 are increased between a minimum and maximum printing fluid density value. Alternatively, the density of printing fluid ejected from the nozzles of PE1 may be decreased from a maximum to a minimum printing fluid density value. The result of the test sample is a collection of printing fluid densities for the print element. The colorimetry characteristics of PE1 may then be measured to give a colorimetry value for each printing fluid density between the minimum and maximum printing fluid densities for PE1. The colorimetry value measured at a chosen printing fluid density in this example relates to a lightness metric (L*) as shown against the y-axis of the graph of FIG. 7. The printing fluid density values can be expressed as an "ink drop density" value as shown against the x-axis of the graph. The set of measured colorimetry values for each ink drop density value provides a colorimetric-deposition relationship for the print element PE1 as shown by the curve for PE1. Each test patch is arranged to have a sufficient pixel count so as to accurately measure a colorimetry for the different printing fluid densities, for example, a 128 by 128 pixel square may be sufficient. The process of blocks 610-650 of FIG. 6 are repeated to obtain a colorimetric-deposition relationship for the further print elements PE2 and PE3. Once all print elements have been selected and the colorimetric-deposition relationships determined for all print elements, the full set of colorimetric-deposition relationships for the printing system are achieved.

Each print element in the printing system is characterized in terms of its colorimetric response versus its ink drop density on media. Each print elements prints a ramp of colors, for example a ramp of primary colors, from a lowest ink drop density (near-white) to highest ink drop density (near saturation). Each ramp is color-measured in lightness (L*) units (or b*).

A reference print element may be determined from a set of colorimetric-deposition relationships for print elements in a printing system as shown by block 460 of FIG. 4. The determination of the reference print element will be described with reference to FIG. 7 which shows three colorimetric deposition relationships for a printing system with three print elements: PE1, PE2 and PE3. To determine which of these print elements is the reference print element, the method of blocks 510-530 are repeated for each print element. In this example a colorimetric value is chosen as indicated by L*x on the y-axis. The corresponding ink drop density values for the three print elements are found for the L*x colorimetric value. As shown in FIG. 7, the ink drop density for PE1 is IDD1; the ink drop density for PE2 is IDD2; and the ink drop density for PE3 is IDD3. The ink drop density values (IDD1, IDD2 and IDD3) are compared to determine which of these values is at an extremity. In this instance, the print element having the lowest ink drop density value (IDD1) is determined as the reference print element (in this example: a "darkest" print element), i.e. PE1, for the chosen colorimetric value L*x.

Calibration data for the print element may be obtained as shown by blocks 530-560 of FIG. 5. The calibration for the selected print element is determined according to the reference print element, as previously described for the ratio of FIG. 5.

Looking to FIG. 7, an example implementation for determining the reference print element may involve choosing a set of "n" arbitrary computational points along the y-axis for L*. For each of these arbitrary points the ink drop density needed to achieve each of these L* values is obtained. Ink ratio (IR) factors may then be computed for each print element, m, as: $IR_{m,n}=IDD_{m,n}/IDD_{PE1,n}$. In the example of FIG. 7, print element PE1 is the reference print element (in this case a "darkest" print element) and therefore the ink drop density values for PE1 are used for the calibration (using the reference print element as the reference in the denominator of the ratio calculation). The ink ratio needed to achieve the same colorimetry as the reference defined by the reference print element is therefore determined for each of the print elements. In this way, a calibration is applied to each of the print elements according to a reference print element.

The set of ink drop densities for each print element and colorimetry values ($IDD_{m,n}$) may be filtered to reduce noise and obtain a "unified" ink drop density factor for each print element ($IDD_m$). This factor may be multiplied with the colorimetry-deposition data for the reference print element to determine an appropriately calibrated output ink drop density value for a given colorimetry.

Figure 8A:
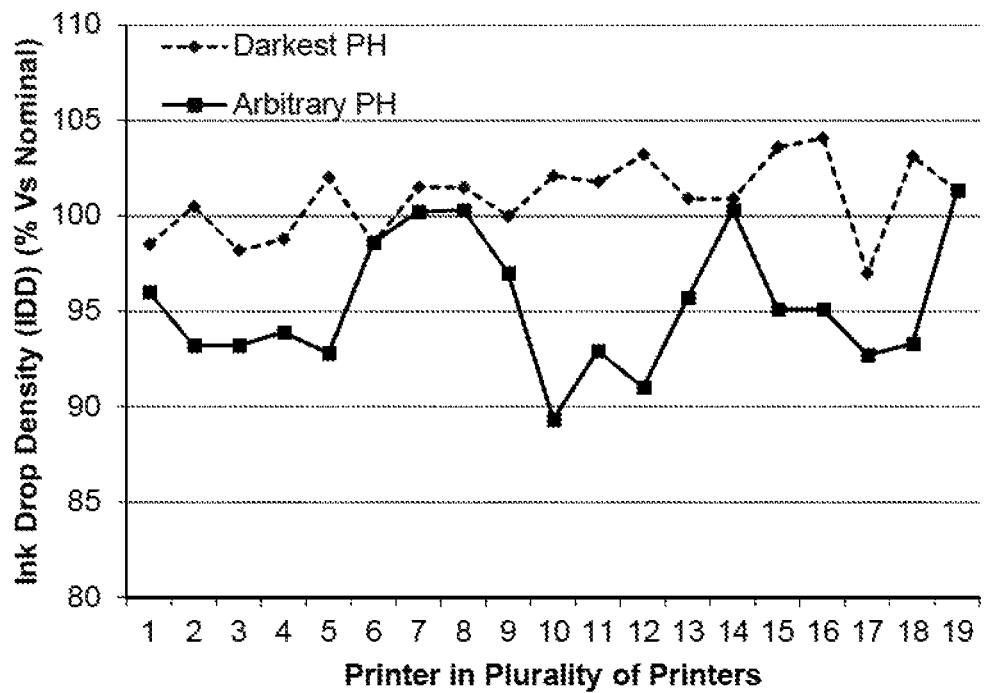
FIG. 8A is a graph showing an example effect on a deposition metric.
Figure 8B:
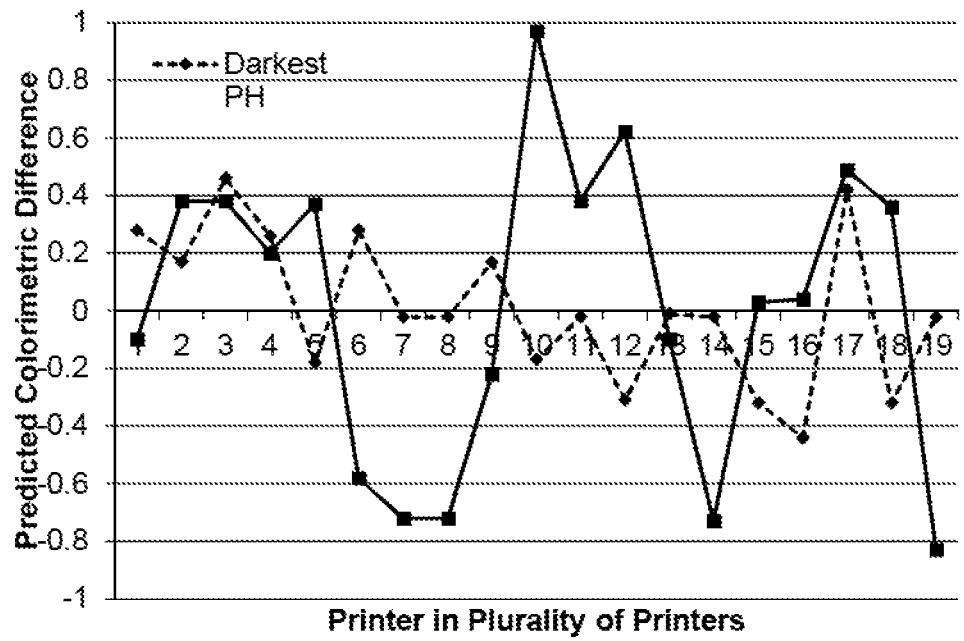
FIG. 8B is a graph showing an example effect on a color metric.

FIGS. 8A and 8B show the effects of choosing a reference print element as a reference for calibration of printing fluid deposition (in the example of FIG. 8A far a "darkest" print element). The statistics shown in FIGS. 8A and 8B are derived a simulation for a printing system having eight print heads, with the assumption that all dies in the print head are similar. A Montecarlo simulation was performed taking account of print head manufacturing tolerance (+/−10%) and drop weight variability along pen life (10%). Two sets of test data are compared: the first set is generated according to the calibration methods described herein, i.e. by selecting a "darkest" print element as a reference; and the second set is generated by simply selecting an arbitrary print element as a reference. FIG. 8A shows how selecting the darkest print element as a reference results in a steadier reference versus choosing an arbitrary print element. The data of FIG. 8A may be translated into an "effective" colorimetric difference, the translation being performed using an empirically derived constant. In the example of FIG. 8A, a constant of 1.5 was used to relate the change in deposition of printing fluid (drop weight) from the reference print element ("darkest" print element) versus the change in ink quantity (expressed as a %), for a test printing system.

FIG. 8B shows how the method for choosing the reference print element as a reference results in less variability between a selected print system and the population average for many print systems.

Figure 9:
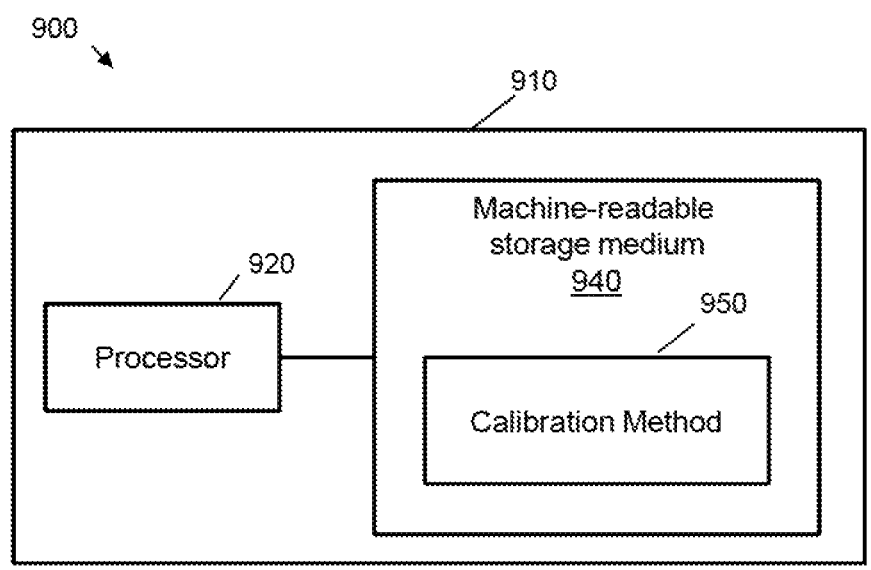
FIG. 9 is a schematic diagram showing a processing device according to an example.

Certain methods and systems as described herein may be implemented by a processor that processes computer program code that is retrieved from a non-transitory storage medium. FIG. 9 shows an example 900 of a print processor 910, which may be print processor 120 of FIG. 1, comprising a machine-readable storage medium 940 coupled to a processor 920. In certain cases the print processor 910 may comprise a computer; in other cases the print processor may comprise a printer, scanner, display device or the like. Machine-readable media 940 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 9, the machine-readable storage medium comprises program code 950 to implement one or more of the methods described above.

Certain calibration methods described herein provide advantageous effects. Certain methods described herein provide a calibration for print elements, for example, for print elements in a page wide array printer. The calibration described is a color calibration performed on an arbitrary media which can then be extrapolated to further media types. This provides the advantage of keeping media waste and calibration time to a minimum, i.e. calibration "waste" may relate to the media and print element resources and time that is used for performing a calibration. For example, a calibration for each type of media is no longer required, instead a calibration compatible across a variety of media types is provided.

The calibration methods described are relevant to print systems using a variety of print media. For example, an application may include the production of a large print job which may be split between multiple printers or print systems from which a color consistency may be expected.

The print systems may be calibrated as described herein to provide color consistency for a large print job split between each of the print systems. The print elements in each print system are accurately calibrated according to embodiments described herein to avoid color consistency and avoid banding (a color mismatch). This results in print outputs from the many print systems in which there are no significant color differences among them.

Advantageously, a print system may be calibrated according to methods described herein to provide a color-consistent print system versus other similar print systems or other printers of its kind. The described calibration methods provide color uniformity with a printing system across a range of media, in addition to providing color consistency and uniformity across other printing systems. In other words, the calibrations described provide a color consistency both across many similar printing systems and a variety of media type, i.e. there is no limitation on the media type for which the calibration procedure was run. Therefore a calibration based on a reference print element enables a color calibration that can be simultaneously extrapolated across different media types and which provides color consistency across similar printing systems.

The calibration methods described herein are symmetrically robust and therefore provide a calibration that is independent of media type which "exports" or "imports" ink ratio factors. Therefore the user of a printing system does not need to be concerned with or worry about on which media type the calibration was performed. This enhances the user's experience of a printing system calibrated using the methods described.

Benefits of the ability to extrapolate the calibration include a printing system or printer using a single media type which is then able to use a variety of media types in which the calibration is still valid. This is because the ink density ratio used for the calibration is largely the same for different media types. This is down to the fact that color density is dependent on ink quantity and in turn also dependent on the drop weight characteristics for each print element. For example, two print elements may have different drop weight characteristics due to manufacturing or aging and therefore will fire different quantities of ink from their nozzles. The calibration or correction required to bring their drop weight characteristics into conformity is the same regardless of media type or substrate onto which ink drops are deposited.

When the calibration is applied to a print element, it is not a requirement for the print element to be selected from a plurality of print elements in the same printing system. A print element may be selected from one or many printing systems and the calibration is still compatible across the many printing systems. The compatibility of the calibration stems from the determination of a reference print element for use as an "absolute" reference. The selected print elements are then calibrated against this reference. All print elements in a printing system may be calibrated against the reference print element by using the reference print element as a reference. Since print elements are manufactured against tight tolerances, brand new print elements will print with similar colorimetry. Therefore a printing system in which the print elements are all new would need little to no calibration. However, as print elements in that printing system are used over time, some print elements are used more frequently than others resulting in a change in their colorimetry. The print elements degrade over time leading to print outputs with lighter color densities. Hence, older print elements have a much different colorimetry than new print elements need calibrating in order to bring the conformity of the older print elements back in line with the new print elements. The older/oldest print elements will generally gradually be replaced by new print elements in time. Therefore in the long run, the printing system will hold a mixture of print elements from different manufacturing batches and with different aging. The colorimetry of the print elements is more heavily dependent on the aging of the print element and not so dependent on the manufacturing batch it is taken from. Calibrating all print elements in a printing system results in a similar colorimetry for all print elements.

Advantageously, since print elements are manufactured to tight tolerances, the reference print element within a printing system is statistically likely to be similar to the reference print element in other printing systems. For example, the probability of selecting a reference print element having an ink drop density close to the reference ink drop density from the distribution of print elements, is near unity for low ink drop densities. This probability may fall abruptly for high ink drop densities, depending on the manufacturing tolerance for the print head. In a printing system, the wear of a print head over its lifetime affects the probability of all print elements being able to print at a given ink drop density, e.g. the output of a set of given print elements may vary. In a printing system comprising one print head, there is a lower probability of having at least one print head dose to the reference ink drop density than compared to a printing system comprising a plurality of print heads. As the likelihood of a given print element being dose to a desired behavior depends on the number of print elements in a printing system, the more print elements in the printing system the higher the probability of the printing system having at least one print element with deposition close to a reference ink drop density. Therefore, the reference print elements can be used to build the colorimetric reference for the rest of the print elements to be calibrated against. A reference print element may be determined based on a mathematical operation performed on a plurality of print element colorimetries. For example, an "abstract" print element may be determined as the reference based on an average of two "darkest" (or "lightest") print element colorimetries in a printing system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for configuring a printing system comprising:
   obtaining data indicative of a relationship between colorimetry and deposition of printing colorant for a plurality of print elements of the printing system;
   determining a reference print element from the plurality of print elements of the printing system based on said data;
   determining calibration data for at least one selected print element in the plurality of print elements based on said data, the calibration data calibrating deposition of printing colorant for the at least one selected print element with reference to the reference print element;
   calibrating the at least one selected print element using the determined calibration data, the at least one selected print element calibrated against the reference print element; and
   printing an image, by the print elements, including by the reference print elements and by the calibrated at least one selected print element.

2. The method of claim 1, wherein the relationship between colorimetry and deposition of printing colorant comprises a relationship between a lightness metric and printing colorant drop density.

3. The method of claim 1, wherein determining a reference print element comprises:
   determining a set of colorimetry-deposition metrics, each colorimetry-deposition metric being for a given set of colorimetric values and being associated with a particular print element in the plurality of print elements;
   determining a print element based on the set of set of colorimetric-deposition metrics.

4. The method of claim 1, wherein determining calibration data comprises:
   determining a printing colorant density ratio for the at least one selected print element, the printing colorant density ratio representing, for a given colorimetric value, a relationship between deposition of printing colorant for the at least one selected print element and deposition of printing colorant for the reference print element.

5. The method of claim 1, wherein obtaining data indicative of a relationship between colorimetry and deposition of printing colorant comprises, for one or more given print elements in the plurality of print elements:
   printing a test sample with the given print element, the test sample comprising a range of printing colorant densities; and
   measuring the colorimetry of the test sample to determine the relationship between colorimetry and deposition of printing colorant for the given print element.

6. The method of claim 1, wherein:
   the relationship between colorimetry and deposition of printing colorant comprises a relationship between an L* metric in an L*a*b* color space and printing colorant drop density,
   determining a reference print element comprises:
   for a set of L* metric values, determining associated printing colorant drop density values for each print element in the plurality of print elements; and
   determining a reference print element as a print element with a lowest printing colorant drop density value for one or more of the set of L* metric values.

7. The method of claim 6, wherein determining calibration data comprises, for one or more given print elements in the plurality of print elements:
   determining at least one calibration factor for the given print element, each calibration factor being based on, for a given L* metric value, a ratio of the printing colorant density value for the given print element and the printing colorant density value for the reference print element.

8. A non-transitory computer-readable medium comprising a program, which when executed by a processing system, causes the processing system:
   use calibration data to determine for a selected print element, an output printing colorant deposition value for a given colorimetry,
   the output printing colorant deposition value being determined as a function of a relationship between colorimetry and deposition of printing colorant for a reference print element;
   calibrate the selected print element using the determined output printing colorant deposition value, the selected print element calibrated against the reference print element; and
   print an image, by a plurality of print elements including the reference print element and the calibrated selected print element.

* * * * *

UNITED STATES PATENT AND TRADEMARK OFFICE
CERTIFICATE OF CORRECTION

PATENT NO. : 10,122,895 B2
APPLICATION NO. : 15/314882
DATED : November 6, 2018
INVENTOR(S) : Marti Rius Rossell et al.

Page 1 of 1

It is certified that error appears in the above-identified patent and that said Letters Patent is hereby corrected as shown below:

In the Claims

In Column 12, Line 20, Claim 8, delete "system:" and insert -- system to: --, therefor.

Signed and Sealed this
Twenty-fifth Day of June, 2019

Andrei Iancu
*Director of the United States Patent and Trademark Office*